Dec. 30, 1952     T. H. KNOTT ET AL     2,623,323
FISHING SINKER
Filed Jan. 20, 1950
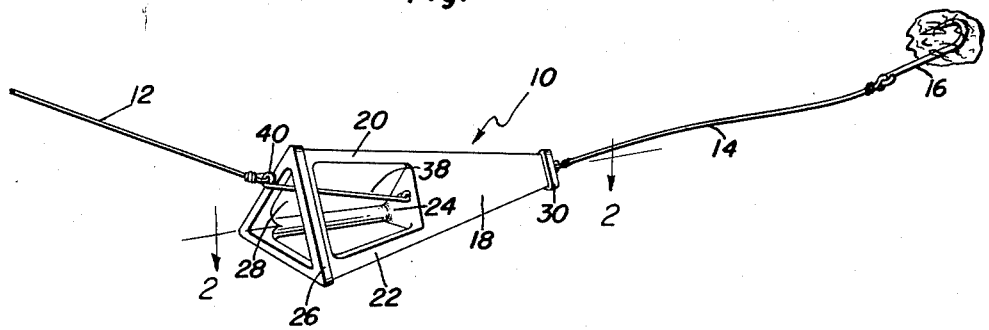
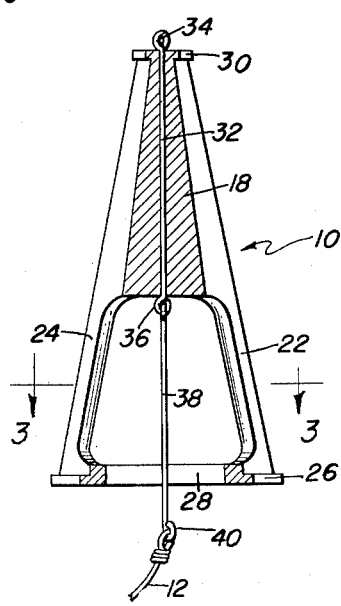
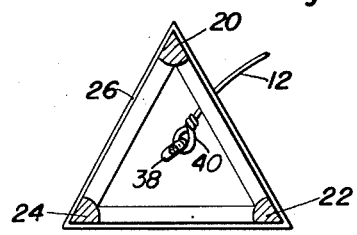
Inventors
Thomas H. Knott
Leonard G. Knott
By Clarence A. O'Brien
and Harvey B. Jacobson
Attorneys Patented Dec. 30, 1952

2,623,323

UNITED STATES PATENT OFFICE 2,623,323

FISHING SINKER

Thomas H. Knott and Leonard G. Knott, Murrieta, Calif.

Application January 20, 1950, Serial No. 139,652

2 Claims. (Cl. 43—44.96)

This invention relates to fishing equipment, and more particularly to a sinker or anchor of novel configuration.

An object of this invention is to provide a sinker which is adapted to hold the fish line against certain tension when it is desired to take up slack in the line without pulling the sinker in.

A further object of the invention is to provide a novel sinker with means adapted to dig into the bottom of the body of water when tension is placed on the line.

Still another object resides in the provision of a sinker having openings therein so arranged that sand and dirt can be moved therethrough by the water currents and not fill up and clog therein so as to render the device inoperative.

Yet another object of the invention is to provide a fishing sinker having ready means for attaching a fishing line thereto, the same means being used to permit the upward tilting of one end of the sinker so as to urge the other end to anchor itself in the bottom.

Additional objects reside in the provision of a fishing sinker, that is strong, durable, highly efficient in operation, simple in construction, easy to manufacture, pleasing in appearance and quite inexpensive.

These, together with the various ancillary objects of the invention which will become apparent from the following description proceeds, are attained by this fishing sinker, a preferred embodiment of which has been illustrated in the accompanying drawings, wherein:

Figure 1 is a perspective view of the fishing sinker showing it in operative emplacement on the bottom of an ocean bed;

Figure 2 is a longitudinal sectional view as taken along line 2—2 in Figure 2 and being enlarged to show the parts thereof in greater detail; and Figure 3 is a transverse sectional view as taken along line 3—3 in Figure 2.

With continuing reference to the accompanying drawings wherein like reference numerals designate similar parts throughout the various views, the numeral 10 generally designates the fishing sinker comprising the present invention. The sinker 10 is of the shape of a truncated pyramid and has means thereon for attaching a fishing line 12 and the leader 14 for a fishhook 16, the leader 14 being optionally constructed of catgut, spring wire, resilient plastics, or other suitable material.

The sinker 10 comprises an upper solid portion 18 of substantially pyramid shape to which are integrally attached legs 20, 22 and 24 which are integrally connected to triangular shaped base 26 at their other end. The base 26 is provided with a triangular opening 28. The triangular base 26 has a greater cross sectional dimension than any portion of the rest of the sinker. This greater size will enable the base to more firmly entrench itself into the bottom of the body of water in which the sinker 10 comprising the invention is being used for fishing. Formed at the end of the sinker opposed to the base 26 is a solid triangular portion 30 of such size as to form a shoulder adapted to dig into the sand or mud bottom.

Within the upper portion 18 is embedded a rod 32 formed of steel wire or other suitable material and which is formed with eyes 34 and 36 at the ends which extend without the upper portion 18. The hook leader 14 is adapted to be secured to the eye 34. A link 38 comprising a rigid rod of steel or other suitable metal is engaged within the eye 36 and is formed with a loop or eye 40 at its other end which extends somewhat without the sinker through the aperture 28. The eye 40 is adapted to receive the fishing line 12 which may be securely fastened thereto.

When it is desired to take up slack in the line 12, it may be reeled in as desired. This will cause the link 38 to raise upwardly and cause the upper portion 18 to rotate upwardly causing the triangular portion 26 to dig deep into the sand. Additionally, because the legs 20, 22 and 24 are so spaced as to provide large openings therebetween, the sand which becomes filled in such space is easily dislocated by movement of the lever 38 so as to not hamper the proper operation of the device.

Since from the foregoing, the construction and advantages of this fishing sinker are readily apparent, further description is believed to be unnecessary.

However since numerous modifications will readily occur to those skilled in the art after a consideration of the foregoing specification and accompanying drawings, it is not intended to limit the invention to the precise embodiment shown and described, but all suitable modification and equivalents of this fishing sinker may be resorted to which fall within the scope of the appended claims.

Having described the invention, what is claimed as new is:

1. In combination with a fish line sinker comprising a body having a solid triangular shaped upper portion, a peripheral flange about said upper portion adapted to become anchored in the bottom ground, a triangular shaped base having an opening therethrough, spaced legs connecting said base to said upper portion, an axially disposed rod extending through said upper portion, an eye formed in each end of said rod, and a rigid link pivotally connected to one of said eyes and extending through said opening in said base, said link being of a length greater than the lengths of said legs and having a line eye on its free end projecting through and beyond the opening in said base.

2. The structure specified in claim 1, wherein said base is in the form of a frame having inner and outer peripheral edge portions and said outer peripheral edge portion projecting beyond the peripheral surfaces of the body and legs to provide flange means adapted to dig and anchor itself on the aforementioned bottom ground.

THOMAS H. KNOTT.
LEONARD G. KNOTT.

REFERENCES CITED

The following references are of record in the file of this patent:

UNITED STATES PATENTS

| Number | Name | Date |
|---|---|---|
| 1,002,981 | Ford | Sept. 12, 1911 |
| 1,897,291 | Andrews | Feb. 14, 1933 |
| 1,913,425 | Black | June 13, 1933 |
| 2,033,683 | Clark | Mar. 10, 1936 |